G. A. REINIGER.
MACHINE FOR MAKING THE BODIES OF CIGARS.
No 2989 - Reissued June 16, 1868
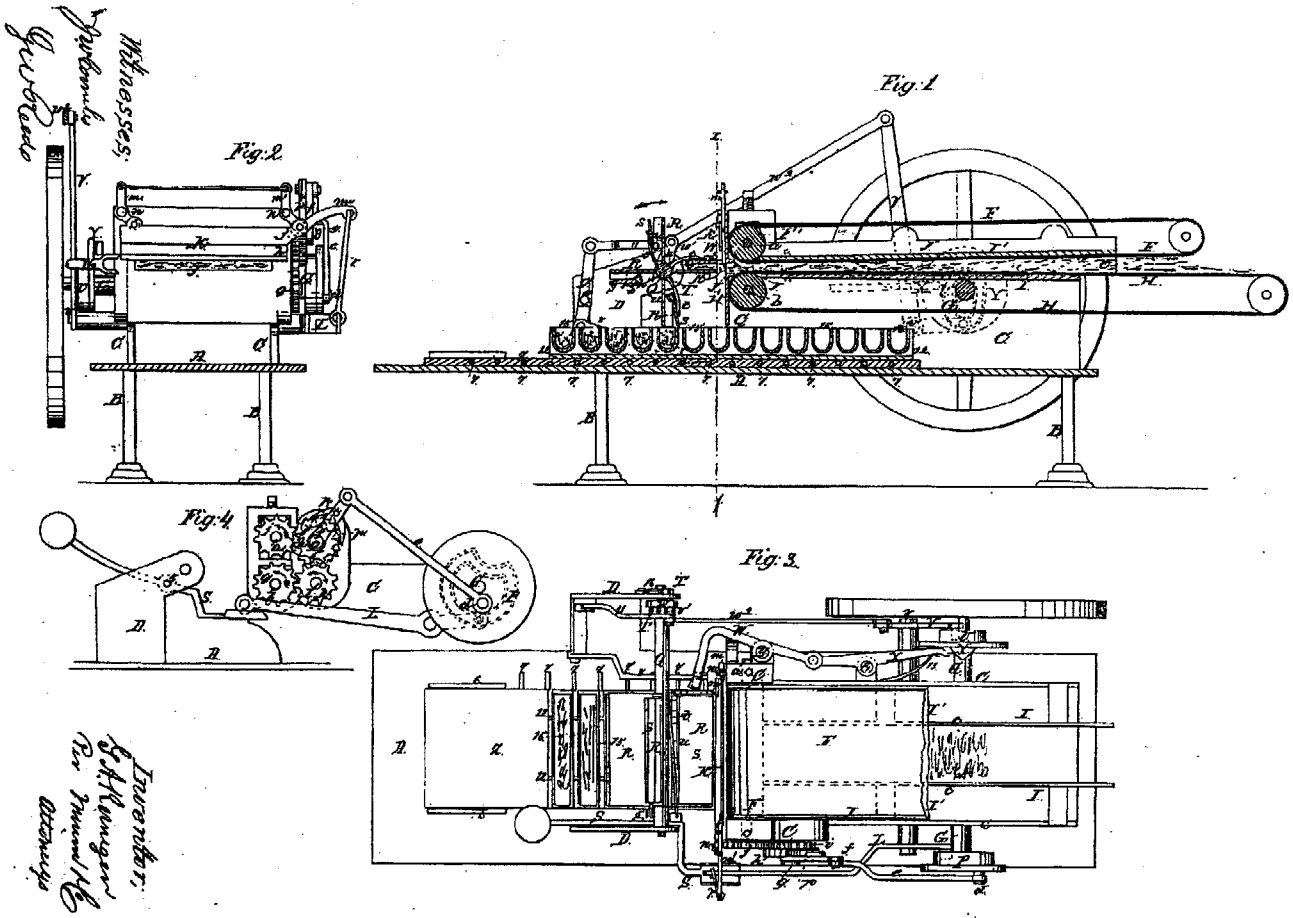
THE NORRIS PETERS CO., PHOTO-LITHO., WASHINGTON, D. C.

UNITED STATES PATENT OFFICE.

GEORGE MOEBS, OF DETROIT, MICHIGAN, ASSIGNEE, BY MESNE ASSIGNMENTS, OF G. ALBERT REINIGER.

IMPROVEMENT IN MACHINES FOR MAKING THE BODIES OF CIGARS.

Specification forming part of Letters Patent No. 33,603, dated October 29, 1861; Reissue No. 2,989, dated June 16, 1868.

*To all whom it may concern:*

Be it known that G. ALBERT REINIGER, of Stuttgart, in the Kingdom of Würtemberg, has invented a new and Improved Machine for Making the Bodies of Cigars; and I do hereby declare that the following is a full, clear, and exact description of the same, reference being had to the accompanying drawings, making part of this specification, in which—

Figure 1 is a longitudinal vertical section of the machine. Fig. 2 is a transverse vertical section of the same in the plane indicated by the line *x x* in Fig. 1, and Fig. 3 is a plan of the same.

Similar letters of reference indicate like parts in the several figures.

The invention of the said G. ALBERT REINIGER consists of a machine in which the leaf-tobacco is conveyed continuously in a compact form to a knife, which cuts into bunches of a uniform size and delivers the bunches in a compact form to suitable receptacles, from which they may be taken without waste of material to receive the wrappers.

To enable others skilled in the art to make and use the invention, the following description is given of its construction and mode of operation.

A is a horizontal bed, of any desired length, supported on standards B B, and having erected upon it two standards, C C, and two, D D, which support the several moving parts of the machine. The standards C C contain bearings for the journals *a b* of the parallel driving-rollers F′ H′ of two endless aprons, F H, of any required length, and bearings for the main shaft G of the machine. The lower apron, H, is longer than the upper one, F, and, except that it has an intermittent longitudinal motion, is fixed, and its upper part rests upon a stationary flat table, I, supported upon the standards C C. The upper apron, F, is attached to a frame, J, which is capable of swinging up and down on the journals *a* of its driving-roller F′, and there is arranged within it, to form an upward bearing for its lower part, a flat plate, I′, which forms the bottom of the frame J, and which is always parallel in a lateral direction with the table I, but at an inclination to it in a longitudinal direction, the distance between them diminishing toward the drawing-rollers F′ H′. The upper apron and plate I′ are supported upon tapered plates *c c*, set up edgewise and parallel with each other, or nearly so, on the table I, and the said table and the plates I′ and *c c* combine to form a flat taper trunk, lined at top and bottom by the two endless aprons, which feed the tobacco through the said trunk to be made into bunches suitable for the bodies of cigars. The aprons have imparted to them simultaneously an intermittent rotary motion by means of an eccentric wrist, *d*, carried by the main shaft G, the said wrist being connected by a rod, *e*, with a lever, *f*, which works on a stud, *g*, secured to one of the standards C C, and which carries pawls *p p*, engaging with a ratchet-wheel, *h*, Fig. 4, on said stud. The said ratchet-wheel has secured to it a spur-gear, *i*, which gears with a spur-gear, *j*, on the roller F′, and also with a spur-gear, *k*, working loosely on a fixed stud, *l*, and gearing with a spur-gear, *q*, on the roller H′. The movement of the ratchet-wheel by the wrist *d*, rod *e*, and pawl *f* produces, through the gears above mentioned, the movement of both driving-rollers F′ H′ and their aprons, and the arrangement of the several gears enables the upper driving-roller, F, to be set farther from or nearer to the roller H, the plate I′ (by reason of its frame J being attached to the journals *a*) always being adjusted with the upper roller. The movements of the aprons take place in the direction of the arrows shown near them in Fig. 1 once during every revolution of the main shaft G.

Close in front of the rollers F′ H′ there is a stationary throat, J, across the front of which there works with an upward and downward movement a knife, K, which is so suspended from levers *m m′*, working on fixed fulcra *n n*, that it will have a drawing cut upon the tobacco, which is delivered by the two aprons through the throat J. This knife is operated by the connection of its lever *m′* by a rod, *r*, with one end of a lever, L, (see Figs. 3 and 4,) working on a fixed fulcrum, *o*, secured in one of the standards C C. The opposite end of the said lever L is so operated upon by a cam, P, on the main shaft as to cause the descent of the knife after every movement of the aprons and make it cut off the quantity of tobacco delivered through the throat J by the movement of the aprons.

Q is a horizontal shaft arranged parallel with the rollers F′ H′ in bearings in the standards D D, and having attached to it, at equal distances from each other and from the axis of the shaft, a number of boxes, R R, having open mouths, and each having one side, *s*, connected with it by a hinge, *u*, and movable under the control of a spring, *t*, attached either to a shaft or to the next box, the said spring tending to open the said movable side of the box. The length of the boxes R R is equal to the width of the space between the plates *c c*, and the width of the said boxes, when closed, is about equal to the depth of the space between the portions of the aprons F H next to the rollers F′ H′. The said springs project beyond the ends of the boxes on one side of the machine, and a lever, S, is attached to that side of the machine by a fixed fulcrum, 5, and this lever is actuated at a proper stage in the operation of the machine by the adjacent end of the lever L pressing upon it to open the movable sides of the boxes in case of the failure of the springs to open them for the discharge of the bunches of tobacco which the boxes R R have received from the throat J. The shaft Q is furnished with a ratchet-wheel, T, having a number of equidistant teeth equal to the number of boxes R R. This ratchet-wheel is moved one tooth at a time once during every revolution of the main shaft G by the action of the cam U on the said shaft upon a lever, V, which works on a fixed fulcrum, *v*, secured in one of the standards C C, the said lever being connected by a rod, $w^2$, with a lever, *w*, working loosely on the shaft Q, and carrying a pawl, *w′*, which engages with the ratchet-wheel T. The movement of the shaft Q by the means just above described is such that a box, R, is presented opposite to the throat J, to receive the front portion of the tobacco fed through the mouth J by each movement of the aprons, preparatory to such portion being cut off by the descent of the knife.

W is a lever working horizontally on a fixed fulcrum, *y*, and having a forked end whose opening is of sufficient size to receive within it the end of one of the boxes R R and close or prevent the opening of its movable sides S. This lever is so operated that its fork advances toward the center of the machine to take hold of the box that has been brought opposite to the mouth J, and keep it closed, and to move off again to permit the box to revolve round with the shaft Q, and this operation is produced by the connection with the opposite end to that which is forked of a second lever, X, Fig. 3, which works upon a fixed fulcrum, 14, and which is operated upon by a cam, Y, upon the shaft G, being held against the said cam by a spring, 13. The shaft Q has upon it a second ratchet-wheel, T′, which is engaged by a pawl, 16, to prevent it from turning the wrong way.

Z is a flat board of any required length, arranged to slide upon the table A between guides 6 6, and furnished on one side with pins 7 7, to be acted upon to move the said board forward in a direction corresponding with the movement of the upper portion of the apron H and the lower portion of the apron F by means of a pawl, 8, connected with a lever, 9, which works on a fixed fulcrum, 10, secured in one of the standards D D. This lever is actuated by means of a rod, 11, connecting it with the pawl-lever W. On this board there are laid rack-frames 12, having notches for the reception of boxes 15 15, of suitable size to contain the bunches of tobacco to form the bodies of the cigars.

The tobacco is made into bunches suitable for the bodies of cigars in the following manner: The leaf-tobacco, having been stripped from the stalks, is laid on the back portion of the apron H, which projects beyond the rear of the apron F, and as the aprons are moved it is carried forward between them and along the taper trunk I I′ *c c*, in which it is compressed to a suitable degree of compactness, and from which it issues between the rollers F′ H′ and through the throat J, and is delivered into the revolving boxes R R as the latter severally and successively come round to receive it, and while the aprons and the boxes are stationary the knife K descends and cuts off the quantity of tobacco which has been delivered through the throat J (and which makes a bunch just sufficient for the body of the cigar) into the box R, which is opposite to the said throat J. This box is revolved by the next movement of the aprons, and as it is turned the movable side of box R, which received the bunch of tobacco last cut off, is opened by the action of the lever S, and the bunch of tobacco is caused to drop from the said box into one of the boxes 15 15, which has moved forward to receive it. The operations of the feeding-aprons and the knife are repeated after every movement of the shaft Q to remove one of the boxes R from and place another opposite to the throat, and a new box 15 is brought forward by the board Z to receive every bunch that is discharged from a box R, a bunch being cut off and deposited in one of the boxes 15 15 every time the main shaft G makes a revolution. The board Z and racks 12 12, containing the boxes 15 15, are removed from the bed A A as often as necessary, and a new board with new racks and boxes placed on the rear of the bed under the aprons. The boxes 15 15 keep the bunches of tobacco divided until the wrappers are to be applied.

What is claimed herein as the invention of the said G. ALBERT REINIGER is—

1. The combination of the aprons F and H, knife K, and traveling racks 12 12 and boxes 15 15, substantially as described.

2. The combination of the taper trunk I I′ *c c*, the aprons F and H, the throat J, the knife K, and the revolving boxes R R, the whole operating together substantially as and for the purpose set forth.

3. Traveling racks and boxes, in combination with boxes for transferring the cut tobacco from the aprons to the traveling boxes, substantially as set forth.

4. The combination of endless aprons, knife-transfer boxes or their equivalents, and suitable boxes to receive and keep the cigar-bodies until the wrappers are applied.

GEORGE MOEBS.

Witnesses:
SAML. S. FISHER,
MORITZ B. PHILIPP.